Patented May 25, 1943

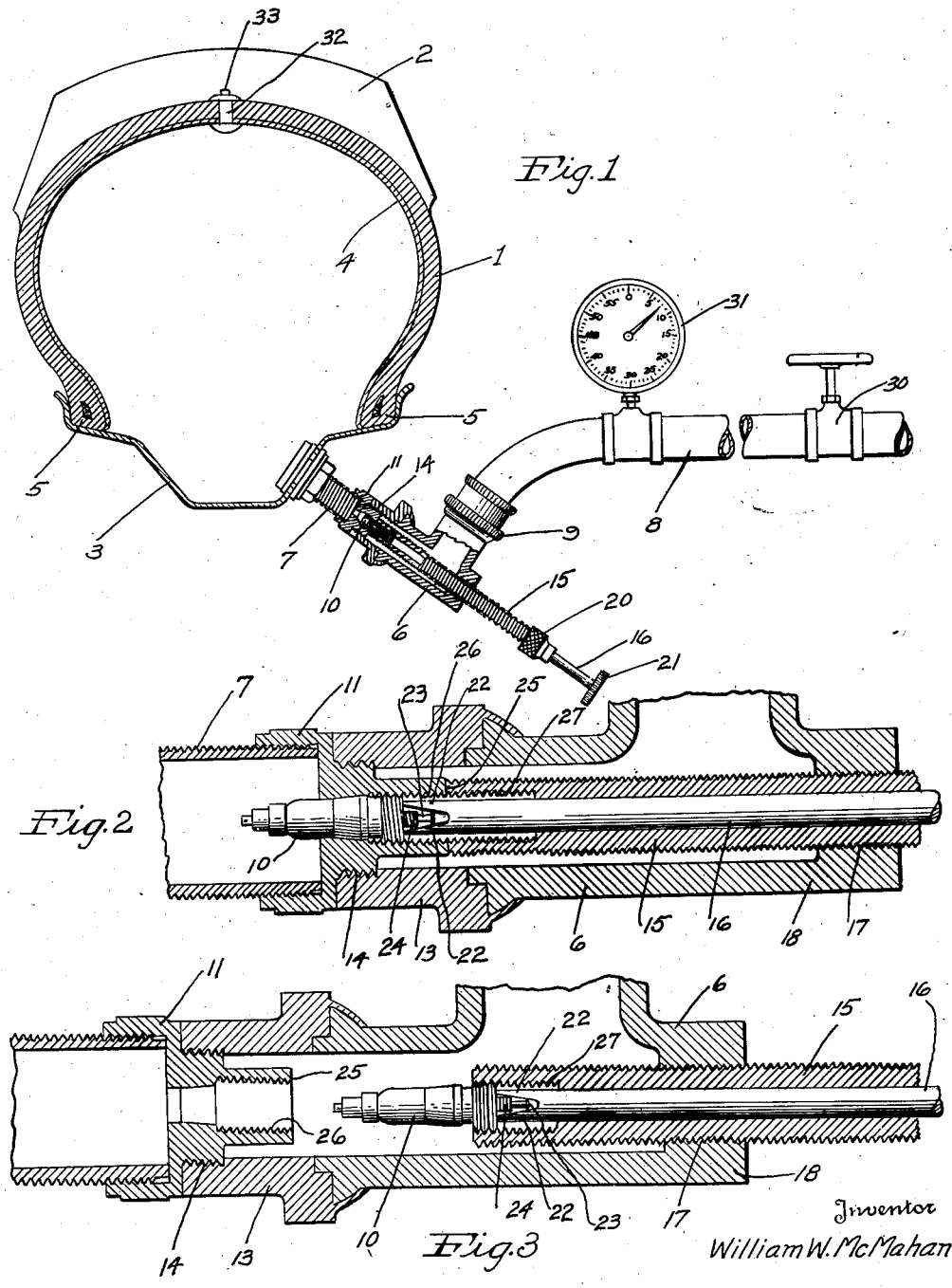

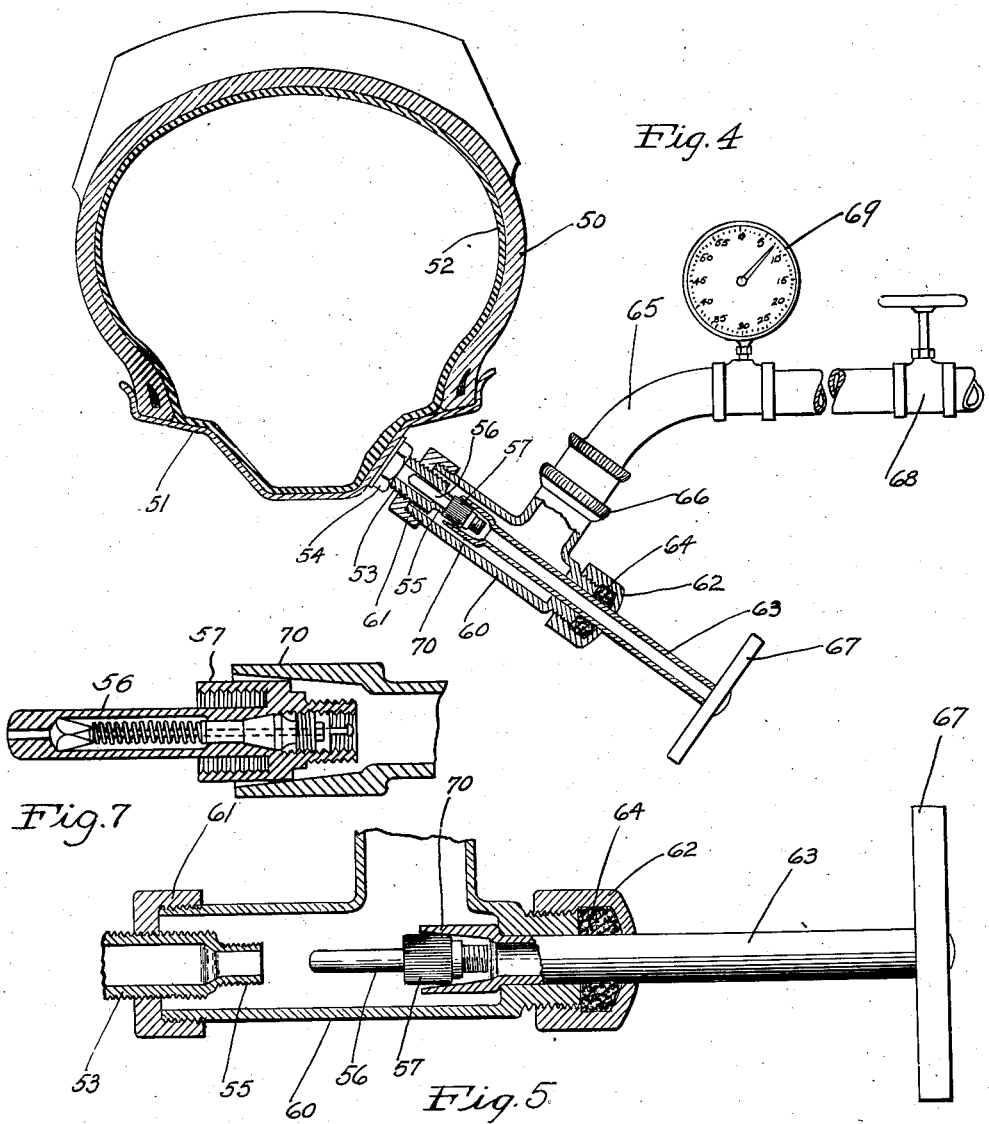

2,320,042

UNITED STATES PATENT OFFICE 2,320,042

TIRE FILLING MEANS

William W. McMahan, Akron, Ohio, assignor to Wingfoot Corporation, Akron, Ohio, a corporation of Delaware Application February 27, 1941, Serial No. 380,818

3 Claims. (Cl. 152—415)

This invention relates to filling tires with water or other liquid and includes means for removing the core from a valve for the introduction of water or other liquid into a tire and for returning the core to the valve after the tire is filled. It also includes means for depressing the valve stem while it is surrounded with water. The water-filling means, herein called an adapter, is adapted for use in filling a vehicle tire with or without an inner tube, whether the tire be filled completely or only partially with the water.

Wherever the specification refers to filling a tire with water, it is to be understood that it includes filling a tire with any aqueous solution, such as a solution of calcium chloride or other salt which will not freeze at the lowest winter temperatures.

The valve-core-removing device may be adapted to remove only the valve core, or it may remove the valve core together with the housing associated with it. The removal of the valve core, with or without the valve housing, is accomplished in a chamber connected to the valve casing by water-tight means, and the valve core may be removed and reinserted after filling the tire with a liquid, without any loss of liquid. The tire may be filled with liquid under any desired pressure with the valve core removed, and the valve core may then be replaced without any decrease in the pressure in the tire.

The invention will be further described in connection with the accompanying drawings which describe the invention more in detail as applied to two different types of conventional valves.

Fig. 1 shows a section through a tire mounted on a rim and the valve-removing means is shown partly in section. Fig. 2 is an enlarged section through the valve-removing means with the valve core seated in the valve casing. Fig. 3 is a section of the same with the valve core removed from the casing. Fig. 4 shows a tire equipped with an inner tube, in section, with a conventional valve of a different type from that shown in Fig. 1 together with valve-removing means shown partly in section. Fig. 5 is an enlargement of the valve-removing means of Fig. 4, partly in section, with the valve core housing removed from the valve casing. Fig. 6 illustrates in longitudinal cross section a modified form of adapter. Fig. 7 is an enlarged longitudinal sectional view of the valve shown in Fig. 5.

Fig. 1 shows a tubeless tire 1. This is a tire designed for use on a tractor or other relatively slowly moving implement. The tread is provided with heavy lugs 2. The tire is mounted on the rim 3. To prevent leakage of water into the interior of the tire, it is coated on the inside with a gum coating 4. In mounting a tubeless tire it has been found advantageous to first place the tire on the rim and to use air pressure to spread the beads and help in seating them on the rim. Due to the leakage of air which occurs between the tire and rim before the beads are properly seated on the rim, no great air pressure can be developed within the tire. Therefore, in order to aid in seating the tire beads 5, it has been found advantageous to place a belt or similar constricting device around the tread of the tire and to tighten the belt and thus force the beads apart. This aids in setting the beads and together with the use of air pressure within the tire, the beads may be firmly seated on the rim. Occasional pounding of the tire with a wooden mallet has been found useful in helping to seat the beads.

When the tire is properly seated on the rim, the air connection is removed from the valve, and the air pressure within the valve is reduced to normal.

The tire is then connected to the adapter 6 by screwing the adapter onto the valve casing 7. The water line 8 is then connected to the adapter through the coupling 9.

Figs. 1 and 2 show the valve core 10 screwed into the cap 11 of the valve casing 7 in the usual way. The adapter 6 is connected to the valve casing by screwing the union 13 over the threads 14 around the top portion of the cap 11. The valve core and valve casing are of the usual type except that in the conventional valve the threads 14 are omitted.

The adapter comprises two movable elements, namely the threaded valve rack 15 and the plunger 16. The rack 15 moves in the threads 17 at the outer end of the housing 18 of the adapter. The rack 15 may be moved in and out by turning in these threads 17. Instead of being threaded in the end of the housing the rack may be smooth surfaced and may move as a plunger in any suitable packing.

The outer end of the rack 15 is closed with the cap 20 through which the plunger 16 moves in suitable packing. The plunger is operated by the handle 21.

The inner end of the plunger is bifurcated and separates into the two parts 22 which fit over the valve stem 23 and the usual brace 24 which connects the opposite sides of the valve core.

In operating the adapter the rack 15 is screwed down until it contacts with the upper portion 25 of the valve housing, as shown in Fig. 2. The thread 26 on the inner wall of this valve housing then forms a continuous thread with the thread 27 on the inner wall of the rack 15. The plunger 16 is then pushed in so that the bifurcated end 22 straddles the valve stem 23 and brace 24. By turning the handle 21 in a counter-clockwise direction the valve core is unscrewed from the threads 26, and it is screwed onto the threads 27 in the inner wall of the rack. After the valve has thus been transferred from the valve casing to the rack 15, the rack is removed from contact with the valve casing 25 by unscrewing it. The valve core 10 is thus removed from the valve casing and held in the rack until it is to be returned. The passageway through the valve being then unobstructed, water is introduced into the tire by opening the valve 30. As the tire fills, the pressure within it increases. The pressure is measured on the gauge 31.

If the tire is to be completely filled with water it will be necessary to vent the entrapped air from the tire. Various means have been suggested for accomplishing this. The air will collect at the top of the tire, and it may be vented through the top of the tire or may be drawn off in any other way. According to one proposal, a rubber tube is inserted through a separate valve, or by a suitable arrangement through the conventional valve, and the inner end of the tube is coated with cork or some light-weight material which causes it to float on the top of the water in the tire and provide means for drawing off the air from above the water. According to another method the inner end of the tube is fastened to the inside of the tire at the center of the tread, and the place where the tube is fastened is marked on the exterior of the tire so that in filling, the tube is positioned with the mark at the top of the tire. In this way the air is drawn off from the inside of the tire through the tube.

Another method of venting the air which is illustrated in the drawings, provides for venting the air through the grommet 32 located at the center of the tread at the top of the tire. The grommet is hollow and is tapped at the outer end. It is closed with the threaded cap 33. By unscrewing the cap the entrapped air is vented to the atmosphere. When all of the air has been driven out through the vent and water commences to spurt through the opening, the cap 33 is replaced. The introduction of water is then continued until a desired pressure, such as twenty-five or forty pounds pressure, is built up in the interior of the tire.

When the desired pressure has been built up within the tire, the valve 30 is closed. The rack 15 is then screwed into the housing of the adapter until it again rests on the top 25 of the valve casing as shown in Fig. 2. The handle 21 is then turned clockwise to screw the valve core 10 out of the rack 15 and return it to the valve casing. When it has been screwed down into the valve casing until it is properly seated, as shown in Fig. 2, the rack 15 is screwed away from the valve. The valve, then being free to operate in the normal way, closes the passage through the valve casing and the adapter may then be removed without loss of water from within the tire. To do this the union 9 is first unscrewed to disconnect the water line 8 and then the adapter is unscrewed off of the threads 14.

By equipping the lower end of the adapter with a pipe union, it is possible to connect the adapter to the valve and to disconnect it without rotating the adapter. If equipped in this way the adapter may be permanently connected with the water line.

Figs. 4 and 5 show the use of the adapter in connection with a different type of conventional valve. The tire 50 is mounted on the rim 51. It is provided with an inner tube 52 in the usual way. The valve casing 53 is connected with the inner tube, and the valve is held in place on the rim nut 54 in the usual way. The adapter may be used equally well with a valve of this type fastened to the rim of a tubeless tire, although when fastened to the rim the valve will have a metal base instead of the flat rubber base shown in the drawings.

The upper end of the valve casing 53 is threaded on the outside as indicated at 55. The valve core housing 56 which contains the usual valve core is connected with the cap 57 which is threaded internally and screws down over the threads 55. The outer surface of the cap is milled, as shown.

The adapter comprises the housing 60 which is closed at the inner end by the cap 61 which screws onto the threads on the valve casing 53. The outer end of the adapter is closed by the cap 62 through which the plunger 63 slides. The packing 64 insures a water-tight joint.

With the tire in a deflated condition the adapter is screwed onto the threads 53 of the valve casing. The water pipe 65 is then connected with the adapter by the union 66. The plunger 63 is pushed into the housing until it grasps the milled cap 57 by its bifurcated or cupped end 70. The handle 67 of the plunger is then turned counter-clockwise to unscrew the cap 57 from the threads 55 on the exterior of the top of the valve casing. When the cap has been unscrewed the handle 67 of the plunger is pulled out, and the valve core housing, together with the valve core, is lifted from the valve casing. This provides a clear passage through the valve casing to the interior of the inner tube.

The water valve 68 is then opened and the inner tube is partially or completely filled with water. Special means for venting the air must be provided if the inner tube is to be filled completely. When the desired pressure is obtained in the inner tube, as indicated by the gauge 69, the valve 68 is closed, or the closing of the valve may be deferred until after the tire valve has been reassembled. The plunger 63 is then pushed into the adapter housing until the cap 57 presses against the top of the valve casing and then by turning the handle 67 of the plunger the cap 57 is screwed onto the top of the valve casing. When the valve core and housing have been thus replaced in their normal position the plunger is pulled out, and the valve is again in position to operate normally. The water connection is then broken by unscrewing the union 66, and the adapter is then removed from the valve casing.

The invention comprises another type of adapter illustrated in Fig. 6 which does not remove the valve core, but merely depresses the valve stem to start the flow of water into the tire. This, of course, is to be used only where a small flow of water is sufficient. No large flow of water is possible due to the presence of the valve mechanism in the valve casing. Such an adapter may, for example, be used for filling a small tire, or where an increase in pressure is desired in a tire already filled with water. The adapter designed for this purpose comprises a housing of the type shown in the drawings, which extends straight out from the valve casing, and its plunger is blunt-ended for depressing the valve stem. As shown in the drawings the end of the plunger 75 enters the valve opening 76 and depresses the pin 77 which operates the valve in the usual way to make an opening through the valve stem for the admission of water into the tire. This adapter may be used in connection with either of the conventional valves shown in the drawings. Although it may be used for filling a large tire, it is not very practical for this use because the flow of water is so small that an impractically long time will be required.

The specific forms of adapter, here shown, may be modified, and the adapter may be provided with means for use on other types of valves.

What I claim is:

1. An adapter for filling a tire with fluid which comprises a housing, means for introducing water into the housing, means for connecting the housing by a water-tight connection with the valve used for inflation of the tire and means operating within the housing for removing the valve core from the valve casing.

2. An adapter of the type claimed in claim 1 characterized by the fact that the means referred to therein as operating within the housing comprises a plunger with a bifurcated end to fit over the valve stem and brace found within the valve.

3. An adapter of the type claimed in claim 1 characterized by the fact that the means referred to therein as operating within the housing comprises a plunger with means at the inner end for grasping the milled cap which holds the valve core housing to the valve casing in the valve.

WILLIAM W. McMAHAN.